United States Patent
Matsui et al.

(10) Patent No.: US 7,931,406 B2
(45) Date of Patent: Apr. 26, 2011

(54) SENSOR-EQUIPPED COVER FOR VEHICULAR-WHEEL BEARING ASSEMBLY

(75) Inventors: Shunichi Matsui, Yamatotakada (JP); Masahiro Kimura, Kariya (JP)

(73) Assignees: JTEKT Corporation, Osaka-Shi (JP); Aisin Seiki Kabushiki Kaisha, Kariya-Shi (JP)

(*) Notice: Subject to any disclaimer, the term of this patent is extended or adjusted under 35 U.S.C. 154(b) by 695 days.

(21) Appl. No.: 11/665,580

(22) PCT Filed: Oct. 31, 2005

(86) PCT No.: PCT/JP2005/020007
§ 371 (c)(1),
(2), (4) Date: Apr. 16, 2007

(87) PCT Pub. No.: WO2006/049126
PCT Pub. Date: May 11, 2006

(65) Prior Publication Data
US 2007/0286541 A1 Dec. 13, 2007

(30) Foreign Application Priority Data

Nov. 1, 2004 (JP) ................................. 2004-317830
Nov. 1, 2004 (JP) ................................. 2004-317831

(51) Int. Cl.
*F16C 32/00* (2006.01)
*G01P 3/48* (2006.01)
(52) U.S. Cl. ...................................... 384/448; 324/173
(58) Field of Classification Search .............. 384/448, 384/544, 586, 589; 324/173, 174, 207.22, 324/207.25; 439/606
See application file for complete search history.

(56) References Cited

U.S. PATENT DOCUMENTS

| | | | | |
|---|---|---|---|---|
| 4,408,479 A | * | 10/1983 | Asai et al. | ..................... 73/35.13 |
| 5,332,964 A | | 7/1994 | Ouchi et al. | |
| 5,602,335 A | * | 2/1997 | Ouchi | ............................. 73/494 |
| 5,938,346 A | * | 8/1999 | Ouchi | ............................. 384/448 |
| 7,249,891 B2 | * | 7/2007 | Aoki et al. | ..................... 384/448 |
| 2004/0150392 A1 | * | 8/2004 | Nakano et al. | ............. 324/207.2 |

FOREIGN PATENT DOCUMENTS

| EP | 1 237 004 A2 | 9/2002 |
|---|---|---|
| JP | 5-107255 A | 4/1993 |
| JP | 7-220822 A | 8/1995 |
| JP | 08285879 A | 11/1996 |
| JP | 10-239340 A | 9/1998 |

(Continued)

*Primary Examiner* — James Pilkington
(74) *Attorney, Agent, or Firm* — Birch, Stewart, Kolasch & Birch, LLP

(57) ABSTRACT

A sensor-equipped structure of a vehicular-wheel bearing assembly mounted to an outer ring member of a vehicular-wheel bearing assembly, is provided with a sensor portion for detecting the rotation of an inner ring member rotatably disposed on a radially inner side of the outer ring member, and a cover formed of a metal. The sensor portion includes a sensor element for magnetically detecting the rotation of the inner ring member; a connector for supporting a terminal electrically connected with the sensor element; and a capacitor. The sensor portion is molded of a synthetic resin and unified with the cover. The cover has a through hole, the synthetic resin extends from an inner side of the cover through the through hole into the connector, the synthetic-resin is in contact with an inner surface of the cover and not in contact with a circumferential surface of the cover defining the through-hole.

5 Claims, 2 Drawing Sheets

FOREIGN PATENT DOCUMENTS

| | | |
|---|---|---|
| JP | 11051949 A2 | 2/1999 |
| JP | 2001-194376 A | 7/2001 |
| JP | 2001-305150 * | 10/2001 |
| JP | 2003-121454 A2 | 4/2003 |
| WO | WO-2004/038426 A1 | 5/2004 |
| WO | WO2004038426 * | 5/2004 |

* cited by examiner

US 7,931,406 B2

SENSOR-EQUIPPED COVER FOR VEHICULAR-WHEEL BEARING ASSEMBLY

TECHNICAL FIELD

The present invention relates to a sensor-equipped cover for vehicular-wheel bearing assembly (hereinafter, simply referred to as "cover"). More particularly, the invention relates to a sensor mounting structure of a cover to which a sensor for detecting a rotational speed of a vehicular wheel is mounted.

BACKGROUND ART

A vehicle needs to detect the rotational speed of vehicular wheels in order to control an antilock brake system (ABS) and a traction control system (TCS). It is therefore a common practice to mount a sensor portion to the cover fitted in one end of an outer ring member of a vehicular-wheel bearing assembly for rotatably carrying the vehicular wheel on a suspension of the vehicle. The sensor portion detects an inner ring member of the bearing assembly or a detected portion fixed to the inner ring member, whereby the rotational speed of the vehicular wheel is detected.

Conventionally, the sensor portion is constructed independently from the cover and is fixed to the cover as inserted in a through-hole formed in the cover. More recently, however, it has been proposed to unify the sensor portion with the cover by the molding of synthetic resin, as shown in FIG. 2, for the purposes of increasing the positioning precisions of the sensor portion and reducing assembly costs (see, for example, Japanese Unexamined Patent Publication No. 2001-194376).

In FIG. 2, a cover 31 formed of a metal sheet is fitted in an inside surface of one end of an outer ring member 32. A sensor portion 37 including a connector 35 for supporting a terminal 34, and a sensor element 36 is molded of the synthetic resin and onto a through-hole 33 formed in the cover 31, so as to be unified with the cover 31.

However, a sensor mounting structure disclosed in the above patent publication has the following problem. A synthetic-resin portion 38 located inwardly of the cover 31 is shaped like a thick block which has a relatively small surface area for its volume. A radial dimension (with respect to a vertical direction as seen in FIG. 2) of the resin portion 38 is smaller than that of a flange 35a of the connector 35 in contact with an outside surface 31a of the cover 31, while an axial dimension (with respect to a transverse direction as seen in FIG. 2) of the resin portion 38 is substantially equal to the radial dimension thereof. Therefore, the resin molding process takes a substantial length of cooling time so that the resin portion tends to suffer the formation of cavities therein, failing to attain a sufficient strength. This leads to the problem that the sensor portion 37 may suffer breakage at its portion fixed (mounted) to the cover 31 so as to disengage from the cover 31.

The synthetic-resin portion 38 having the sensor element 36 embedded therein has the radial dimension (with respect to the vertical direction as seen in FIG. 2) substantially equal to that of the connector 35 located on the outside surface 31a of the cover 31. To provide a capacitor for preventing the noise invasion into the sensor element 36, the synthetic-resin portion 38 is increased in the axial dimension (with respect to the traverse direction as seen in FIG. 2) so that the whole body of the bearing assembly is increased in size accordingly. This leads to another problem that the bearing assembly is decreased in the degree of design freedom.

Furthermore, the connector 35 and the synthetic-resin portion covering the sensor element 36 are required of different degrees of strength. In a case where these components are formed of the same material, the more stringent one of the specifications (one for the synthetic-resin portion of the connector 35) must be adopted. Hence, the bearing assembly as a whole has an excessive quality, which results in cost increase.

In addition, the integral molding process requires large molds, which have complicated configurations. It is therefore far from easy to produce the molds. This constitutes another factor of the cost increase.

SUMMARY OF THE INVENTION

In view of the foregoing, it is an object of the invention to provide a cover wherein the sensor portion mounted to the cover is increased in the mounting strength by preventing the formation of cavities in the sensor portion and which may increase the degree of design freedom of the vehicular-wheel bearing assembly by allowing for the reduction of the axial dimension thereof.

Another object of the invention is to provide a cover wherein the sensor portion mounted to the cover is increased in the mounting strength by preventing the formation of cavities in the sensor portion and which may achieve cost reduction.

MEANS FOR SOLVING THE PROBLEMS

According to a first aspect of the invention, there is provided a sensor-equipped cover for vehicular-wheel bearing assembly mounted to an outer ring member of a vehicular-wheel bearing assembly, provided with a sensor portion for detecting the rotation of an inner ring member rotatably disposed on a radially inner side of the outer ring member via rolling elements, and formed of a metal; wherein the sensor portion includes: a sensor element for magnetically detecting of the rotation of the inner ring member in non-contact manner; a connector for supporting a terminal electrically connected with the sensor element; and a capacitor, the sensor portion is molded of a synthetic resin and unified with the cover at its part extended through and around a through-hole formed in the cover, and a synthetic-resin portion located inwardly of the cover is extended beyond a flange of the connector in contact with an outside surface of the cover, as making contact with an inside surface of the cover.

It is preferred that the capacitor is located at place radially inwardly from the sensor element.

In the cover according to the first aspect of the invention, the synthetic-resin portion located inwardly of the cover is extended beyond the flange of the connector in contact with the outside surface of the cover, as making contact with the inside surface of the cover. Hence, the synthetic-resin portion has an increased surface area for its volume, so that the synthetic-resin portion has a smaller axial dimension than that of a prior-art synthetic-resin portion. Furthermore, the synthetic-resin portion is increased in the area of contact with the metal cover having a great thermal conductivity, as compared with the contact area of the prior-art synthetic-resin portion. Therefore, the cooling rate of the resin is increased so that the formation of cavities in the resin may be suppressed. Thus, the sensor portion mounted to the cover is able to maintain a good mounting strength over an extended period of time.

The axial dimension of the synthetic-resin portion may be reduced by locating the capacitor at place radially inwardly from the sensor element and by radially extending the synthetic-resin portion located inwardly of the cover. Thus, the axial dimension of the bearing assembly may be reduced accordingly. Therefore, the bearing assembly is increased in the degree of design freedom. In addition, the cooling rate of the resin is further increased so that the formation of cavities in the resin may be reduced even further.

According to a second aspect of the invention, there is provided a sensor-equipped cover for vehicular-wheel bearing assembly mounted to an outer ring member of a vehicular-wheel bearing assembly, provided with a sensor portion for detecting the rotation of an inner ring member rotatably disposed on a radially inner side of the outer ring member via rolling elements, and formed of a metal; wherein the sensor portion includes: a sensor element for magnetically detecting the rotation of the inner ring member in non-contact manner; and a connector for supporting a terminal electrically connected with the sensor element, that the connector comprises a substantially cylindrical body formed with a flange at one end thereof, the flange being disposed in contacting relation with an outside surface of the cover and substantially in alignment with a through-hole formed in the cover, a synthetic resin is molded in a manner to cover the sensor element and to extend through the through-hole and into the connector, and a synthetic-resin portion extended into the connector is formed to engage with an inner edge portion of the flange of the connector.

In the cover according to the second aspect of the invention, the connector and the synthetic-resin portion covering the sensor element are constituted as independent members and the resin portion molded for mounting the sensor portion to the cover is reduced in volume so as to be cooled at a higher cooling rate. Therefore, the formation of cavities in the resin may be prevented. As a result, the sensor portion mounted to the cover is increased in the mounting strength so as to be prevented from disengaging from the cover. The synthetic-resin portion covering the sensor element is so formed as to intrude into the connector by an insert molding process. Furthermore, the synthetic-resin portion intruding into the connector is so formed as to engage with the inner edge portion of the flange of the connector. Therefore, the connector, the cover and the synthetic-resin portion covering the sensor element may be rigidly combined together.

Since the connector and the synthetic-resin portion covering the sensor element are constituted as the independent members, an optimum synthetic resin material may be adopted according to each of the strengths required of these members. As a result, the cost reduction may be achieved.

In addition, the connector and the synthetic-resin portion covering the sensor element may be formed using discrete molds and hence, the molds have simplified structures. This leads to the reduction of manufacture costs of these members.

BEST MODES FOR CARRYING OUT THE INVENTION

Referring to the accompanying drawings, a detailed description will hereinbelow be made on covers according to first and second embodiments of the invention.

Figure 1:
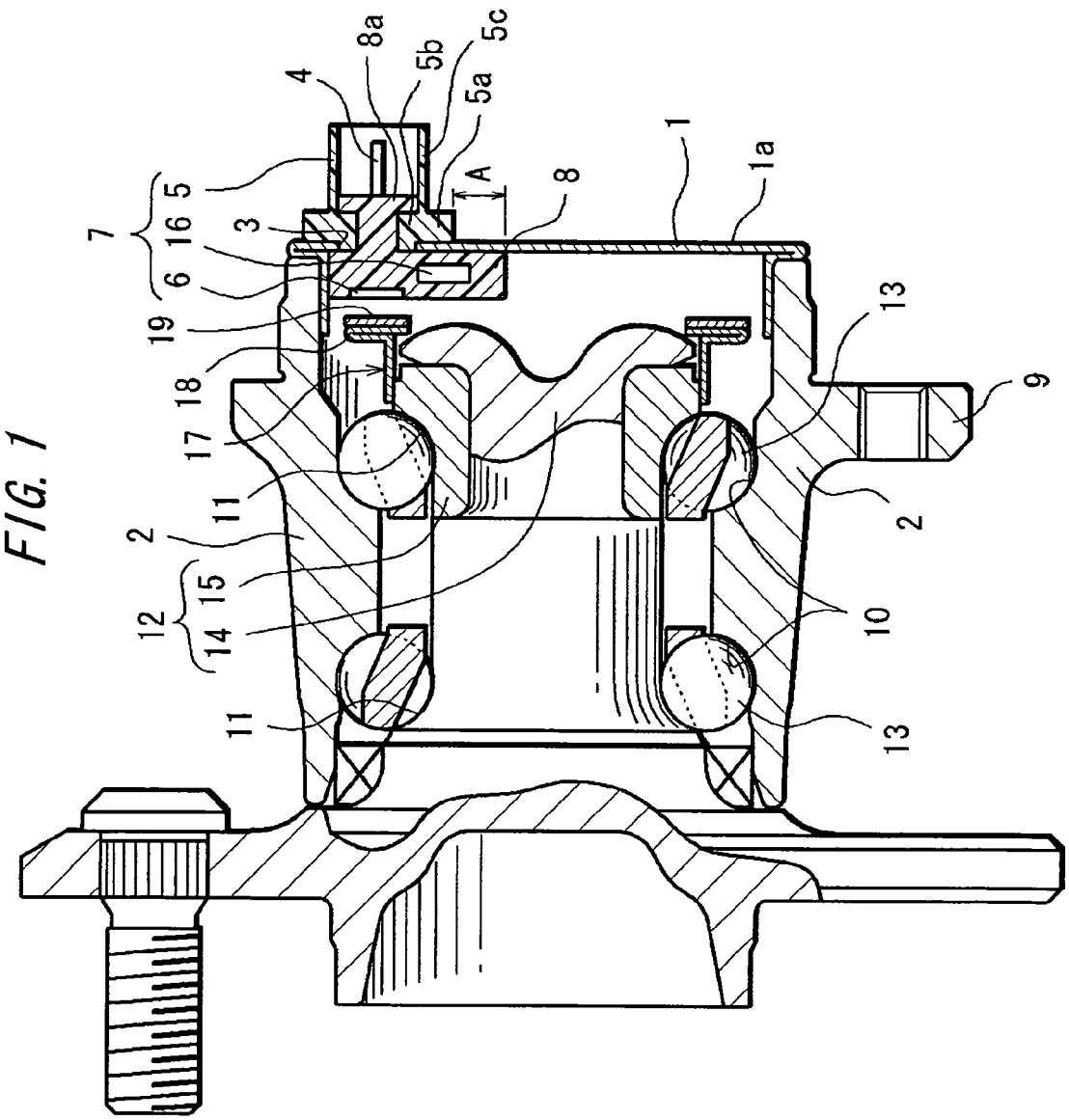
FIG. 1 is a sectional explanatory view of a vehicular-wheel bearing assembly to which a cover according to one embodiment of the invention is mounted.
Figure 2:
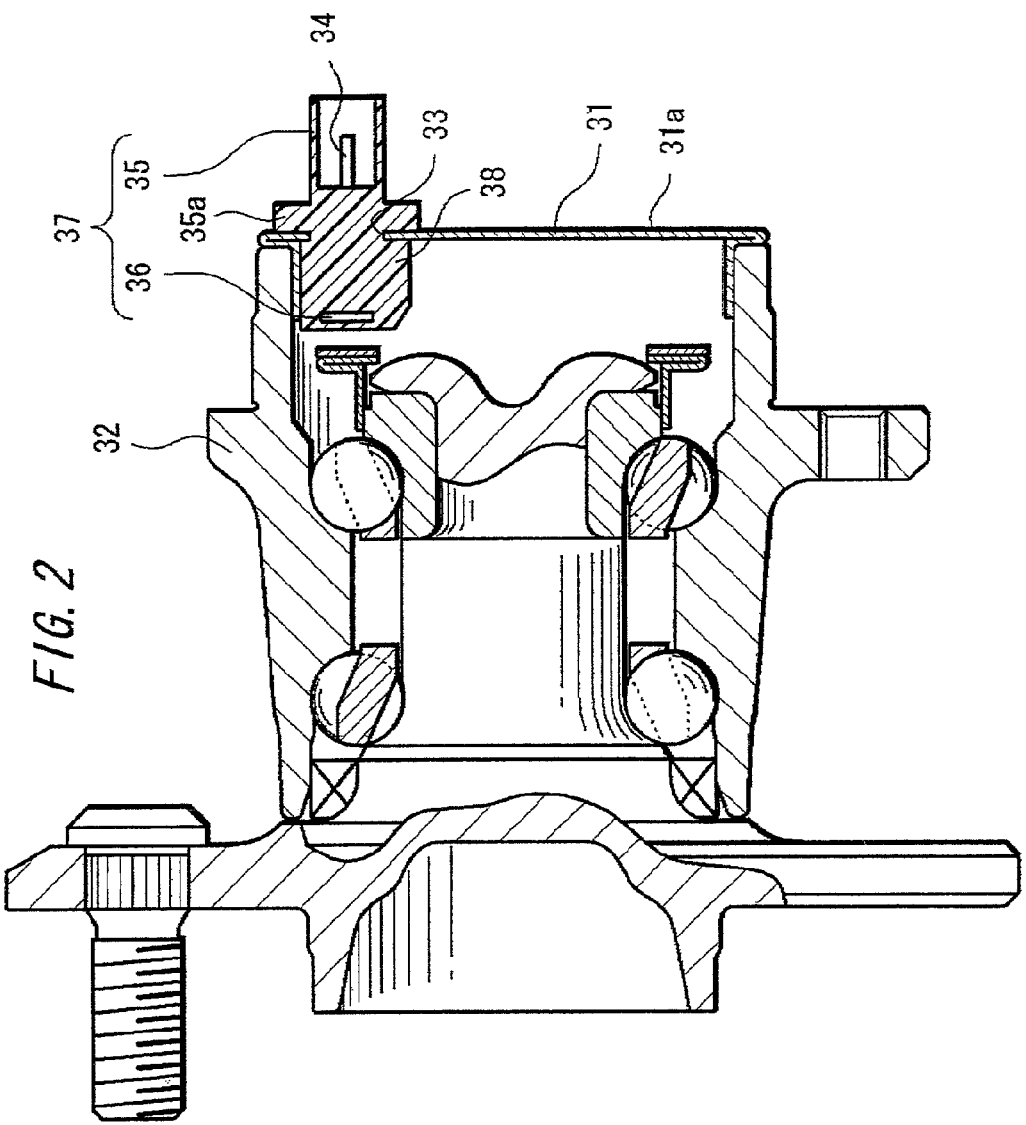
FIG. 2 is a sectional explanatory view of a vehicular-wheel bearing assembly to which a conventional cover is mounted.

FIG. 1 shows, in section, a vehicular-wheel bearing assembly to which a cover according to one embodiment of the invention is mounted. The bearing assembly is a vehicular-wheel bearing assembly for use in a driven wheel of a vehicle. The bearing assembly includes: an outer ring member 2 fixed to a vehicle body by means of a mounting flange 9 and including plural rows of outer raceway surfaces 10 formed on an inner periphery thereof; an inner ring member 12 disposed radially inwardly of the outer ring member 2 in a concentric relation therewith and including plural rows of inner raceway surfaces 11 on an outer periphery thereof; and balls 13 as rolling elements arranged in plural rows and rollably interposed between the respective raceway surfaces 10, 11 of the outer ring member 2 and the inner ring member 12. The inner ring member 12 includes a hub spindle 14 and an inner-ring component member 15 which is independent from the hub spindle 14 and fitted on an outer periphery of a vehicle-inner end of the hub spindle 14. The hub spindle 14 is rotatably supported by the outer ring member 2 via the plural rows of balls 13.

An opening at one end (vehicle-inner end) of the outer ring member 2 is closed by a cover 1 which is formed, for example, by press working iron or the like. Specifically, the cover 1 having a closed-end short cylinder shape is fitted in an inner periphery of the end of the outer ring member 2. A sensor portion 7 including a connector 5 supporting a terminal 4 connected with a sensor element 6 at one end thereof, and a capacitor 16 connected with the sensor element 6 is molded of a synthetic resin and unified with the cover 1 at its part extended through a through-hole 3 formed in the cover 1. The sensor element 6 is so disposed as to confront a magnet portion 19 via a predetermined gap therebetween, the magnet portion being provided at a ring-like annular portion 18 of a support ring 17 fixed to an outer periphery of a vehicle-inner end of the inner-ring component member 15.

In the cover according to the embodiment, the sensor portion 7 including the sensor element 6, the connector 5 and the capacitor 16 is unified with the metal cover 1 by the molding of synthetic resin in the following manner. A synthetic-resin portion 8 located inwardly of the cover 1 is extended beyond a range corresponding to a flange 5a of the connector 5 in contact with an outside surface 1a of the cover 1, as making contact with an inside surface of the cover. On the other hand, the capacitor 16 is located at place radially inwardly from the sensor element 6 (at place radially inwardly from the sensor element with respect to an axis of the bearing assembly). This permits the synthetic-resin portion 8 disposed inwardly of the cover 1 to have a relatively large surface area for its volume. Furthermore, the synthetic-resin portion is increased in cooling rate because the synthetic-resin portion is increased in the area of contact with the metal cover 1 having a great thermal conductivity as compared with a prior-art resin portion and because the synthetic-resin portion may be in contact with the inside surface of a portion of the cover, the back side of which portion is not in contact with the flange 5a of the connector 5 (the inside surface of the portion of the cover indicated by "A" in FIG. 1). Hence, the synthetic-resin portion may be prevented from suffering the formation of cavities therein. As a result, the sensor portion 7 mounted to the cover 1 is adapted to maintain a good mounting strength over an extended period of time, so that the sensor portion 7 is prevented from being displaced or disengaging from the cover 1.

The capacitor 16 is disposed at place radially inwardly from the sensor element 6 and the synthetic-resin portion 8 on the inside surface of the cover 1 is radially extended, whereby the synthetic-resin portion may have a reduced axial dimension (with respect to an axial direction of the vehicular-wheel bearing assembly). Hence, the axial dimension of the bearing assembly is reduced accordingly, so that the bearing assembly may be increased in the degree of design freedom. The axial dimension of the bearing assembly may be reduced at a ratio on the order of 0.4 to 0.8, for example, provided that an axial dimension of a synthetic-resin portion unifying the resin portion with the cover by the conventional method is defined as 1. In the case of a vehicular-wheel bearing assembly for use in general automotive vehicles, the axial dimension thereof may be normally reduced by about 2 to 9 mm.

According to the embodiment, the following method may be used for mounting the sensor portion 7 to the cover 1. First, the connector 5 for supporting the terminal connected with the sensor element 6 at one end thereof is fixed to a predetermined portion of the cover 1 by means of a jig in a manner to align an opening of the flange 5a thereof with the through-hole 3 of the cover 1. It is noted that the capacitor 16 is connected with the sensor element 6 as disposed at place radially inwardly from the sensor element 6. Subsequently, the synthetic-resin portion is formed by an insert molding process such that a part of the synthetic-resin portion may intrude into a recess of the connector 5. Thus, the sensor portion 7 may be mounted to the cover 1 so as to be unified therewith.

The embodiment is constituted such that the sensor portion 7 including the sensor element 6, the connector 5 and the capacitor 16 is unified with the metal cover 1 as follows. That is, the connector 5 and the synthetic-resin portion 8 covering the sensor element 6 are constituted as the independent members. The synthetic-resin portion 8 covering the sensor element is so formed as to intrude into the connector 5 by the insert molding process. Furthermore, the synthetic-resin portion intruding into the connector 5 engages with an inner edge portion of the flange 5a of the connector 5. More specifically, the connector 5 for supporting the terminal 4 connected with the sensor element 6 at one end thereof is previously formed as the independent member. This connector 5 is unified with the cover 1 by molding the synthetic resin. The connector 5 includes: a cylindrical body 5c; the annular flange 5a formed at one end of the cylindrical body 5c and protruded radially outwardly of an outer periphery of the cylindrical body 5c; and an inner edge portion 5b formed at the one end of the cylindrical body 5c and protruded radially inwardly of an inner periphery of the cylindrical body 5c. A part of the synthetic-resin portion 8 covering the sensor element 6 is extended beyond the inner edge portion 5b of the connector 5 and into the cylindrical body 5c so as to define an engaging portion 8a. The inner edge portion 5b and the engaging portion 8a are shaped like hooks engaging with each other. As shown in FIG. 1, the inner edge portion 5b extends from the cylindrical body 5c, and the inner edge portion 5b is in contact with the circumferential surface of the cover 1 defining the through-hole 3. The inner circumferential surface of the inner edge portion 5b defines a connector through-hole. The synthetic-resin portion 8 extends through the connector through-hole into the cylindrical body 5c and fully occupies the connector through-hole. In addition, as shown in FIG. 1, the synthetic-resin portion 8 extends from the inner side of the cover 1 through the through-hole 3 into the connector 5 at the outer side of the cover 1. The engaging portion 8a of the synthetic-resin portion 8 encloses and is in contact with a portion of the terminal located within the cylindrical body 5c of the connector 5 and at the outer side of the cover 1. The synthetic-resin portion 8 is in contact with the inner surface of the cover 1 and not in contact with a circumferential surface of the cover 1 defining the through-hole 3. The inner edge portion 5b of the connector 5 has an inner portion (not labeled) fully within the through-hole 3. A circumferential surface of the cover 1 defining the through-hole 3 is in contact with the inner portion of the inner edge portion that is fully within the through-hole 3. The engaging portion 8a of the synthetic-resin portion 8 has a portion (not labeled) fully within the through-hole 3. The portion of the engaging portion 8a fully within the through-hole 3 is in contact with the inner portion of the inner edge portion 5b fully within the through-hole 3, and is not in contact with the circumferential surface of the cover 1 defining the through-hole 3.

The connector 5 and the synthetic-resin portion 8 covering the sensor element 6 are constituted as the independent members, so that the resin portion molded for mounting the sensor portion 7 to the cover 1 may be reduced in volume so as to be cooled at a higher cooling rate. Thus, the formation of cavities in the resin portion may be prevented. As a result, the sensor portion 7 mounted to the cover 1 is increased in the fixing (mounting) strength so as to be prevented from disengaging from the cover 1. The synthetic-resin portion covering the sensor element 6 is so formed as to intrude into the connector 5 by the insert molding process. Furthermore, the constitution is made such that the synthetic-resin portion (engaging portion) 8a intruding into the connector 5 engages with the inner edge portion 5b of the flange 5a of the connector 5. Therefore, the connector 5, the cover 1 and the synthetic-resin portion 8 covering the sensor element may be rigidly combined together.

Since the connector 5 and the synthetic-resin portion 8 covering the sensor element 6 are constituted as the independent members, an optimum synthetic resin material may be adopted according to each of the strengths required of these members. As a result, the cost reduction may be achieved.

In addition, the connector and the synthetic-resin portion covering the sensor element may be formed in discrete molds and hence, the molds have simplified structures. This leads to the reduction of manufacture costs of these members.

While the foregoing embodiment uses the magnet portion disposed at the outer periphery of the end of the inner-ring component member as a detected portion, the invention does not particularly limit the constitution of the sensor portion including the type or the location of such a detection object, and the type of the sensor element. Any of those components normally used in the art may be adopted as needed.

The invention claimed is:

1. A sensor-equipped structure of a vehicular-wheel bearing assembly mounted to an outer ring member of the vehicular-wheel bearing assembly, provided with a sensor portion for detecting the rotation of an inner ring member rotatably disposed on a radially inner side of the outer ring member via rolling elements, and a cover formed of metal secured to the outer ring member, the cover having an inner side facing the inner ring member and an outer side facing away from the inner member, wherein the sensor portion includes: a sensor element for magnetically detecting the rotation of the inner ring member in a non-contact manner; a connector on the outer side of the cover for supporting a terminal electrically connected with the sensor element, the terminal extending within the connector to the outer side of the cover; and a capacitor, wherein the sensor portion is molded of a synthetic resin and unified with the cover, wherein the cover has a through hole, the synthetic resin extends from an inner side of the cover through the through hole into the connector at an outer side of the cover, the connector has an inner edge portion having an inner portion fully within the through hole, a circumferential surface of the cover defining the through hole is in contact with the inner portion of the connector fully within the through hole, the synthetic resin encloses and is in contact with a portion of the terminal located within the connector, and the synthetic resin is in contact with an inner surface of the inner side of the cover, and wherein the synthetic resin that extends through the through hole is in contact with the inner portion of the connector fully within the through hole, and is not in contact with the circumferential surface of the cover defining the through hole.

2. The sensor-equipped structure according to claim 1, wherein the capacitor is located at a place radially inwardly from the sensor element.

3. The sensor-equipped structure according to claim 1, wherein the connector has a cylindrical body and the inner edge portion extends from the cylindrical body, an inner circumferential surface of the inner edge portion defining a connector through-hole, the synthetic resin that extends through the through hole extends through the connector through-hole into the cylindrical body and fully occupies the connector through-hole.

4. A sensor-equipped structure of a vehicular-wheel bearing assembly mounted to an outer ring member of the vehicular-wheel bearing assembly, provided with a sensor portion for detecting the rotation of an inner ring member rotatably disposed on a radially inner side of the outer ring member via rolling elements, and a cover formed of metal secured to the outer ring member, the cover having an inner side facing the inner ring member and an outer side facing away from the inner member, wherein the sensor portion includes: a sensor element for magnetically detecting the rotation of the inner ring member in a non-contact manner; and a connector on the outer side of the cover for supporting a terminal electrically connected with the sensor element, the terminal extending within the connector to the outer side of the cover;

wherein the connector comprises a substantially cylindrical body formed with a flange at one end thereof, the flange being in contact with an outer side surface of the outer side of the cover and substantially in alignment with a through hole formed on the cover, wherein a synthetic resin is molded in a manner to cover the sensor, wherein the synthetic resin extends from the inner side of the cover through the through hole into the connector on the outer side of the cover, the connector has an inner edge portion having an inner portion fully within the through hole, a circumferential surface of the cover defining the through hole is in contact with the inner portion of the connector fully within the through hole, the synthetic resin encloses and is in contact with a portion of the terminal located within the connector, and the synthetic resin is in contact with an inner surface of the inner side of the cover, and wherein the synthetic resin that extends through the through hole is in contact with the inner portion of the connector fully within the through hole, and is not in contact with the circumferential surface of the cover defining the through hole.

5. The sensor-equipped structure according to claim 4, wherein the inner edge portion extends from the cylindrical body, an inner circumferential surface of the inner edge portion defining a connector through-hole, the synthetic resin that extends through the through-hole extends through the connector through-hole into the cylindrical body and fully occupies the connector through-hole.

\* \* \* \* \*